US011131845B2

(12) United States Patent
Hamann et al.

(10) Patent No.: US 11,131,845 B2
(45) Date of Patent: Sep. 28, 2021

(54) HIGH SPEED RANDOM ACCESS VARIABLE FOCUSING AND STEERING OF A PATTERNED LINE

(71) Applicant: The Board of Trustees of the Leland Stanford Junior University, Stanford, CA (US)

(72) Inventors: Stephen S. Hamann, Mountain View, CA (US); Olav Solgaard, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 226 days.

(21) Appl. No.: 16/528,252

(22) Filed: Jul. 31, 2019

(65) Prior Publication Data

US 2020/0041865 A1   Feb. 6, 2020

Related U.S. Application Data

(60) Provisional application No. 62/713,208, filed on Aug. 1, 2018.

(51) Int. Cl.
*G02F 1/29* (2006.01)
*G02B 26/00* (2006.01)
*G02B 27/50* (2006.01)
*G02B 26/10* (2006.01)
*G02B 27/00* (2006.01)
*G02B 27/46* (2006.01)
*G02B 27/01* (2006.01)
*G01J 9/02* (2006.01)

(52) U.S. Cl.
CPC ......... *G02B 26/008* (2013.01); *G02B 26/005* (2013.01); *G02B 26/10* (2013.01); *G02B 27/0087* (2013.01); *G02B 27/0172* (2013.01); *G02B 27/46* (2013.01); *G02B 27/50* (2013.01); *G02F 1/292* (2013.01); *G01J 2009/0238* (2013.01)

(58) Field of Classification Search
CPC .......... G02F 1/292; G02B 26/10; G02B 27/46
See application file for complete search history.

(56) References Cited

U.S. PATENT DOCUMENTS

| 5,311,360 A | 5/1994 | Bloom |
| 5,982,553 A | 11/1999 | Bloom |
| 6,614,580 B2 | 9/2003 | Amm |

(Continued)

OTHER PUBLICATIONS

Phare et al., "Silicon Optical Phased Array with High-Efficiency Beam Formation over 180 Degree Field of View", 2018, arXiv:1802. 04624.

(Continued)

*Primary Examiner* — Kevin M Nguyen
(74) *Attorney, Agent, or Firm* — Lumen Patent Firm (57) ABSTRACT

A patterned line of optical radiation can be steered in the other two directions (e.g., line patterned in y, steered in x and z) with a 1-D phase shifter array in a Fourier optics configuration. Preferably the patterned line is provided by forming a line focus and modulating it with an array of grating light valve devices in an amplitude modulation configuration. Phase modulation is preferably provided with an array of grating light valve devices in a phase modulation configuration.

12 Claims, 11 Drawing Sheets

(56) References Cited

U.S. PATENT DOCUMENTS

2009/0303597 A1* 12/2009 Miyawaki .............. G02B 27/46
359/559
2009/0323169 A1* 12/2009 Bloom ................... G02B 26/10
359/291

OTHER PUBLICATIONS

Author unknown "An 8192-Channel Grating Light Valve for Ultra-Violet Direct-Write Lithography", 2015, Silicon Light Machines.
Zohrabi et al., "Wide-angle nonmechanical beam steering using liquid lenses", 2016, Optics Express vol. 24, No. 21 23798.
St-Hilaire et al., "Color images with the MIT holographic video display", 1992, SPIE vol. 1667 Practical Holography VI.
Kollin et al., "Real-Time Display Of 3-D Computed Holograms By Scanning The Image Of An Acousto-Optic Modulator", 1989, SPIE v 1136.
Hamann et al., "High-speed random access optical scanning using a linear MEMS phased array", 2018, Optics Letters vol. 43, No. 21.
Hamann et al., "Variable Focusing and Steering Using High Speed MEMS Phased Array", 2018 ResearchGate 10.1109/OMN.2018.8454579.

* cited by examiner

HIGH SPEED RANDOM ACCESS VARIABLE FOCUSING AND STEERING OF A PATTERNED LINE

CROSS REFERENCE TO RELATED APPLICATIONS

This application claims the benefit of U.S. provisional patent application 62/713,208, filed on Aug. 1, 2018, and hereby incorporated by reference in its entirety.

FIELD OF THE INVENTION

This invention relates to variable focusing and steering of a patterned line of optical radiation

BACKGROUND

High speed variable focusing and beam steering of optical beams is difficult to achieve, and has applications in 3D scanning, imaging and direct view displays. To better appreciate some of the issues involved, it is helpful to note some of the difficulties encountered in conventional 3D display approaches. Briefly, regular stereoscopy creates vergence-accommodation mismatch, digital blurring requires eye tracking, and light field and holography are computationally expensive and require high pixel counts with small elements. Accordingly, it would be an advance in the art to provide improved optical technology suitable for 3D displays and for other optical applications.

SUMMARY

We have found that a patterned line of optical radiation can be steered in the other two directions (e.g., line patterned in x, steered in y and z) with a 1-D phase shifter array in a Fourier optics configuration. One application of this result is to utilize high speed 1D amplitude and phase modulators to time-multiplex many images (lines) to create a single, true depth frame, thereby providing an improves 3D display.

For direct view display, scanning a patterned line gives a 2D response, while changing the focus creates depth cues for a 3D image. Scanning a single pixel or more complex patterned line at high speeds can be used for LIDAR or 3D imaging in a far field configuration or confocal microscopy or structured illumination microscopy in a focal system. Additional imaging applications are likely.

Significant advantages are provided relative to conventional scanning/focusing methods. Utilizing the phase modulator with an amplitude grating light valve allows for random access scanning and high speed variable focusing. Traditional mechanical scanners do not allow for random access scanning. Liquid crystal or tunable lenses can be used similarly, but are much slower. Waveguide phased arrays cannot be used with free space optics.

DETAILED DESCRIPTION

Figure 1:
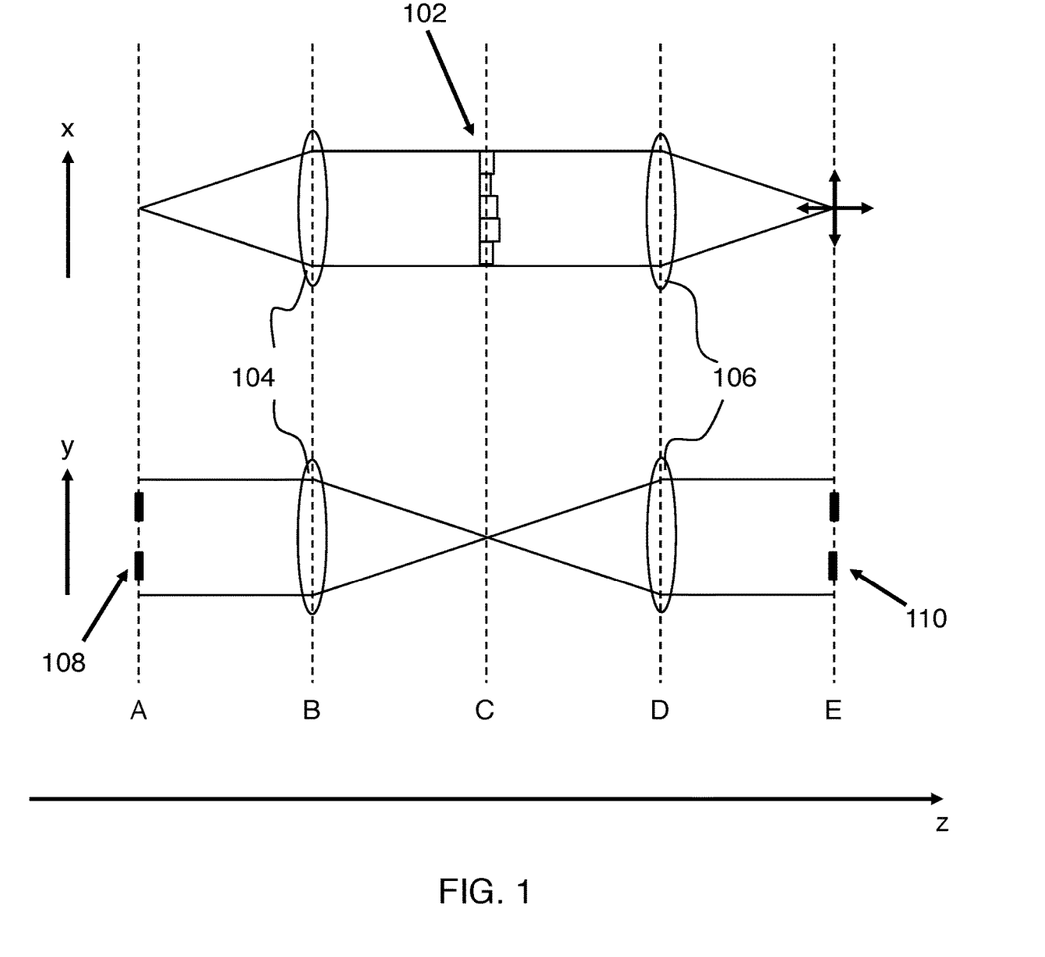
FIG. 1 shows an exemplary operating concept of some embodiments of the invention.

FIG. 1 schematically shows operation of an exemplary embodiment of the invention. The optical system of this example is a 4f Fourier imaging configuration, where plane C is a Fourier image of plane A and plane E is a Fourier image of plane C. Here 104 and 106 are the spherical lenses that provide such Fourier imaging. We have found that this kind of Fourier imaging configuration can lead to surprising results with useful applications when the input beam is significantly anamorphic (i.e., a line image or the like) as opposed to a conventional 2D input, such as a 2D image. Here we define 'light' to have a wavelength range from 200 nm to 2000 nm.

The anamorphic input is schematically shown as having an x-focal point at plane A and being collimated in y at plane A. Furthermore, the anamorphic input is amplitude modulated along the y direction, as schematically shown by pattern 108. At plane C, a 1-D phase modulator array 102 is disposed that provides a variable phase shift as a function of x, schematically shown by varying pixel thicknesses of 1-D phase modulator array 102. Note that the Fourier transform of the line focus along y at plane A is a line focus along x at plane C.

The result at plane E has the remarkable feature that output pattern 110 is a replica of input pattern 108 independent of the phase shifts provided by modulator 102. Instead, the effect of modulator 102 on the output is to move the output line image around, as schematically shown by double headed arrows. More specifically, a linear phase shift vs. x at plane C will steer the output line image up or down in the x-direction, and a quadratic phase shift vs. x at plane C will change the focusing position, thereby moving the output line image backward or forward in z, relative to plane E. The amplitude and phase modulations are preferably operated in such a way that their responses are synced, so that one may be changed at the same time and speed as the other.

Accordingly, an embodiment of the invention is an optical apparatus including: means for providing a first line-focus of light that is amplitude modulated along its length to provide amplitude modulated light; first Fourier optics (e.g., 104 on FIG. 1) configured to receive the amplitude modulated light and to provide a second line-focus, where a second light pattern of the second line-focus is substantially a 2-D Fourier transform of a first light pattern of the first line-focus; and a 1-D phase modulator array (e.g., 102 on FIG. 1) disposed to align with the second line-focus and to provide phase modulated light.

In the case of a grating light valve 1-D amplitude modulator array as described below, a spatial filter in plane C (e.g., spatial filter 744 on FIG. 7C) will be needed to select a specific diffraction order to provide the amplitude modulation. The 1-D phase modulator array is positioned so that it is in the focus of the Fourier lens and aligned with the zeroth [first] order of the diffracted response of the grating light valve 1-D amplitude modulator array. The zeroth order would be chosen where light utilization efficiency is the most important, and the first order would be chosen in cases were amplitude contrast is most important. The 1-D phase modulator array is then used to steer the beam and as a variable focus optical element.

In the following description, horizontal and vertical will be used with the following meanings: The term horizontal in this case is arbitrary, but indicates an orientation that is orthogonal to the axis of propagation and perpendicular to some vertical axis, which is also orthogonal to the axis of propagation.

Figure 2A:
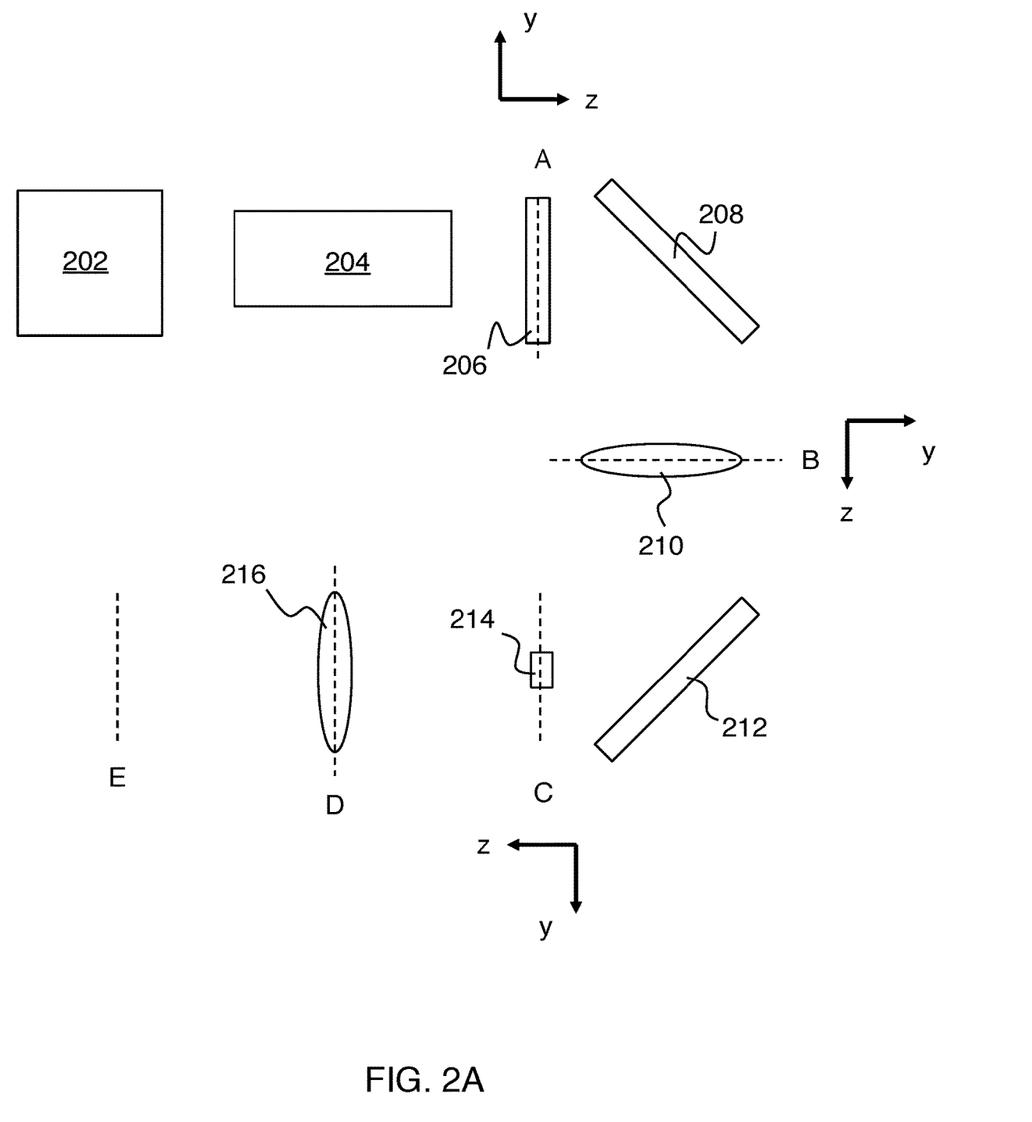
FIGS. 2A-C schematically show three implementations of the concept of FIG. 1.

Practice of the invention does not depend critically on how this basic concept is implemented. FIG. 2A shows a first exemplary embodiment. Here 202 is an optical source, 204 is anamorphic input focusing optics configured to provide a line focus at plane A, and 206 is a transmissive 1-D amplitude modulator array configured to pattern the line focus along the y direction. Fold mirrors 208 and 212 are included for convenience of illustration and to facilitate comparison with later embodiments. Lenses 210 and 216 are in a Fourier imaging configuration as described above. Transmissive 1-D phase modulator array 214 is configured to provide a phase modulation of the Fourier line focus along the x direction (e.g., as shown by 102 on FIG. 1). It is convenient to consistently take the x direction to be perpendicular to the plane of the figures (i.e., 'vertical' as described above) and to take the z direction to be in the propagation direction. The y direction is consistently perpendicular to both x and z (i.e., horizontal as described above). The resulting coordinate systems are shown on FIG. 2. The reason to use multiple coordinate systems like this is to greatly facilitate the description of what happens to the optical beam as it propagates though the system. Thus, the arrangement of FIG. 2A provides optical beam transformation as shown on FIG. 1.

The single lens design as described in connection with FIGS. 1 and 2A is the simplest method of imaging the Fourier response of the 1-D amplitude modulator array onto the 1-D phase modulator array. More lenses may be used, such as two or more anamorphic optics or three or more odd number of spherical lenses, so long as the result is the Fourier response of the 1-D amplitude modulator array is focused onto the 1-D phase modulator array.

Figure 2B:
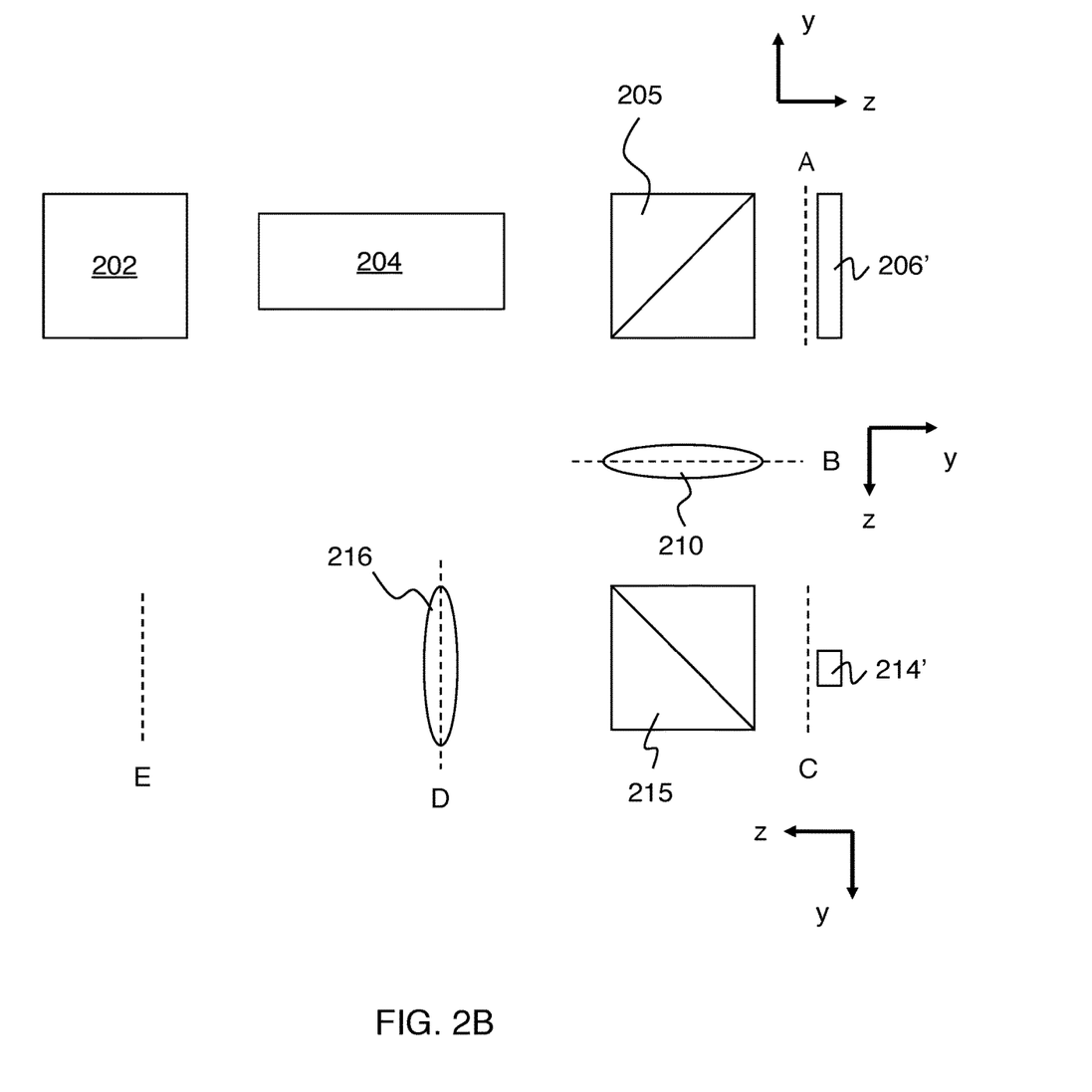

Reflective modulators can be used instead of transmissive modulators. FIG. 2B shows an example. Here transmissive 1-D amplitude modulator array 206 of FIG. 2A is replaced with beam splitter 205 and reflective modulator 206'. Similarly, transmissive 1-D phase modulator array 214 of FIG. 2A is replaced with beam splitter 215 and reflective modulator 214'. Here also the arrangement of FIG. 2B provides optical beam transformation as shown on FIG. 1.

Practice of the invention does not depend critically on the kind of 1-D amplitude modulator array employed. For example, grating light valves, liquid crystal modulators and digital mirror devices can all be used. However, grating light valves are a preferred approach for the 1-D amplitude modulator array because of their high speed and inherently linear design. Grating light valves include an array of elements of two or more reflective, electrostatically actuatable ribbons. For each element, every second ribbon of the element can be actuated downwards towards a common plate by a voltage while the other ribbons are held still. This action creates a variable difference phase grating, which will divert less [more] light power from [to] the zeroth order [first order] in reflection as the actuated pixels are moved from zero deflection to a quarter wavelength deflection. Amplitude modulation is achieved by blocking the undesired orders, so that only the light through the desired order is passed through the system (e.g., spatial filter 744 on FIG. 7C).

The above-referenced means for providing a first line-focus of light can include: an optical source; input optics configured to receive input light from the optical source and to provide the first line-focus; and a 1-D amplitude modulator array disposed to align with the first line-focus and to provide the amplitude modulated light. The 1-D amplitude modulator array can include an array of grating light valve devices, and an amplitude modulation spatial filter disposed to pass a selected diffraction order of the second line-focus. The selected diffraction order of the second line-focus can be a zeroth diffraction order. The selected diffraction order of the second line-focus can be a +1 or −1 diffraction order.

Practice of the invention also does not depend critically on the kind of 1-D phase modulator array employed. For example, grating light valves, liquid crystal modulators and tilt and shift capable deformable mirrors can all be used. Here also, grating light valves are a preferred approach for the 1-D phase modulator array because of their high speed. Scanning mirrors, while capable of high speeds, are generally incapable of variable focus and cannot achieve random access pointing, which grating light valves can provide.

A grating light valve 1-D phase modulator array includes a phased array with elements of one or more reflective, electrostatically actuatable ribbons. The method of actuation is the same as described above. However, rather than actuating every other ribbon of the element, every ribbon is deflected in common. The ribbon(s) are deflected downward, causing the light to travel further and accrue phase. At a half wavelength of deflection, the reflected light accrues a full wavelength of phase delay, and so any phase profile can be achieved equivalently by using only a half wavelength of deflection. The preferred phase modulator array as described above is referred to as a grating light valve device in deference to common usage in the art. However, there is, strictly speaking, no 'grating' or 'light valve' action in such devices in a phase modulating configuration.

A linear ramp profile with a slope equal to the variable linear coefficient of the profile that is wrapped every half wavelength is used to steer the beam in the Fourier or far field response of the 1-D phase modulator array as a linear phased array. The angle of deflection is equal to the arcsin of the wavelength of the illumination light divided by the width of the phase element times the slope of the phased array. The most extreme steering occurs at a slope of a half wavelength every other element, so that power is diverted into the first orders. A quadratic profile that is wrapped every half wavelength is used as a variable focuser as it approximates the profile of a parabolic mirror element. The focus of this parabolic phased array is equal to one quarter of the inverse of the quadratic coefficient of the parabolic profile. For simultaneous variable steering and focusing, a linear profile and quadratic profile are added together and wrapped every half wavelength. This results in an effective multiplication of the equivalent field profiles, so that the sheet is shifted in the Fourier or far field response of the device.

The example of FIG. 2B is a system for axial and lateral scanning of a patterned line. This design would be useful as illumination for microscopy, structured illumination for 3D imaging, 3D printing or a volumetric display. A single Fourier lens 216 is placed at a distance past the 1-D phase modulator array 214', such that the conjugate image of the amplitude patterned horizontally oriented line is formed some nominal distance past lens 216. The axial location of this image can then be scanned laterally in the vertical direction by a linear phase profile and can be scanned forward and backwards within the plane of propagation by a parabolic phased profile. Again, the single-lens design is the simplest, but may incorporate more elements so long as the principle response is the conjugate image of the amplitude modulated light steered and scanned by the 1-D phase modulator array.

Accordingly, an embodiment of the invention can further include second Fourier optics (e.g., 216 on FIG. 2B) configured to receive the phase modulated light and to provide a third line-focus, where a third light pattern of the third line-focus is substantially a 2-D Fourier transform of the second light pattern of the second line-focus.

Figure 2C:
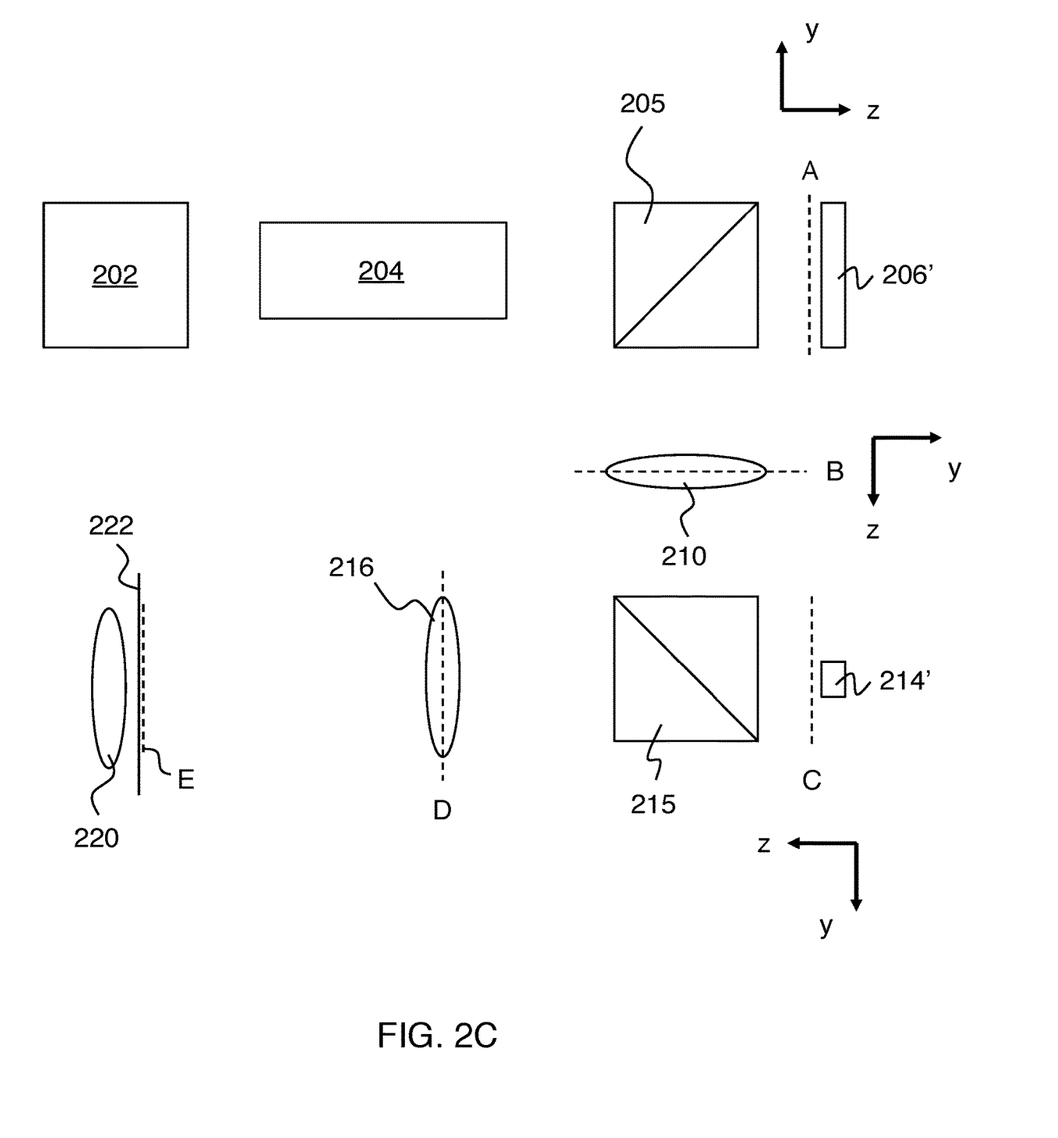

FIG. 2C shows addition of projection optics 220 to the example of FIG. 2B. This is a system for far field projection that would be useful for LIDAR and other remote sensing applications by projecting a scannable patterned line which can then be used as the response basis for the remote sensing system. A second Fourier lens 216 is used to image the Fourier response of the 1-D phase modulator array 214' onto a spatial filter 222 so that it is shifted by the 1-D phase modulator array and its resulting vertically spaced higher orders are blocked. Here spatial filter 222 is wide enough to permit beam steering of the line image through the spatial filter and narrow enough to block higher diffraction orders. This spatial filter is conjugate to the amplitude modulated light, so that the orientation of the line is horizontal and patterned with the amplitude response. This conjugate response can be projected into the far field by a projection lens 220 that is placed one focal distance past the filter. The far field is then conjugate to the 1-D amplitude modulator array such that the resulting projected sheet is horizontal in orientation and is patterned by the 1-D amplitude modulator array, and is steered by the 1-D phase modulator array. The angular response of this system, such as the angle of steering of the 1-D phase modulator array, is magnified by an amount equal to the ratio of the focal length Fourier lens divided by the focal length of the projection lens. This design is of the simplest two lens projection system, and can incorporate more optical elements such as anamorphic optics for aspect ratio adjustment. Additionally, a parabolic profile of the 1-D phase modulator array can be used to focus the far field response to a specific point if desired or help correct for axial misalignments in the system arising from shifting elements.

Accordingly, an embodiment of the invention can further include second Fourier optics (e.g., 216 on FIG. 2C) configured to receive the phase modulated light and to provide a third line-focus, where a third light pattern of the third line-focus is substantially a 2-D Fourier transform of the second light pattern of the second line-focus; and projection optics (e.g., 220 on FIG. 2C) configured to provide a far field radiation pattern corresponding to the zeroth diffraction order of the third line-focus. This embodiment can further include an output spatial filter (e.g., 220 on FIG. 2C) disposed to pass a zeroth diffraction order of the third line-focus and to block nonzero diffraction orders of the third line focus.

Figure 3:
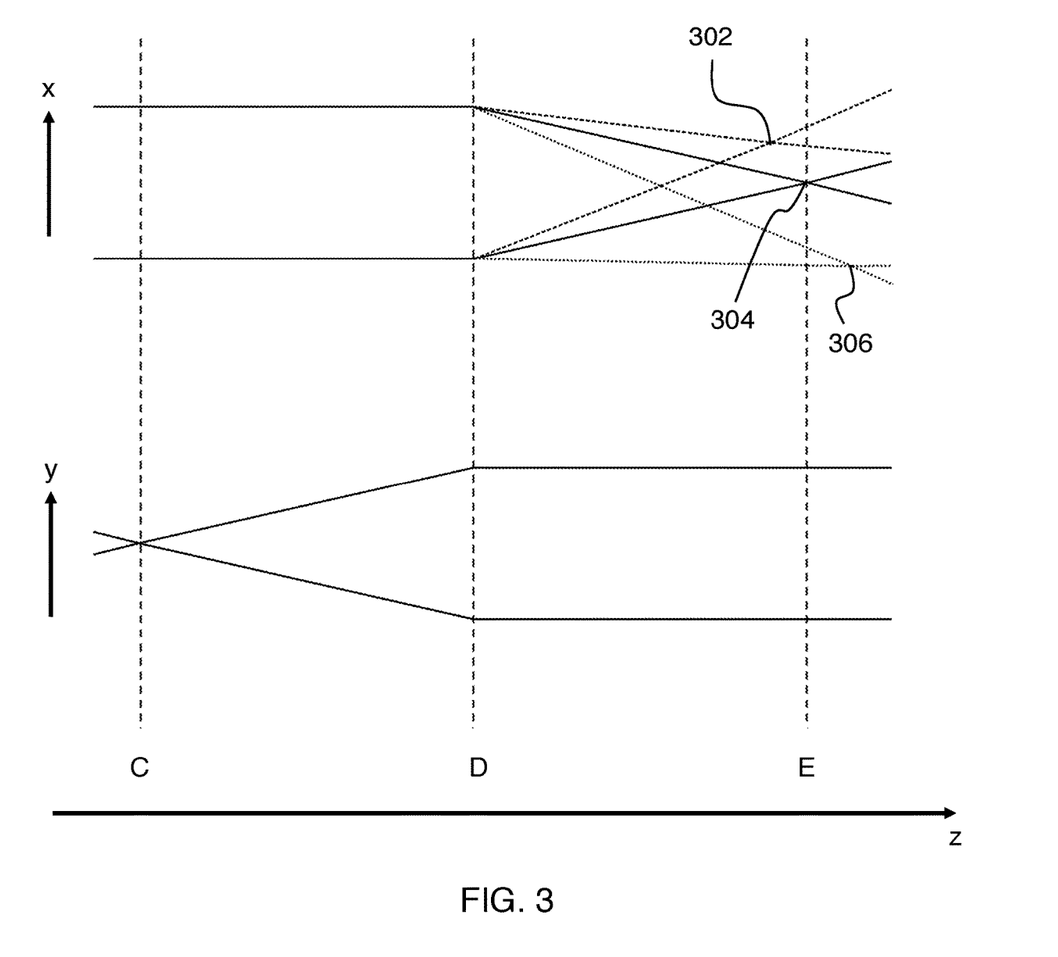
FIG. 3 schematically shows exemplary ray traces for the configuration of FIGS. 2A-B.

FIG. 3 shows the beam steering of FIG. 1 more explicitly. Here 302, 304 and 306 are three different exemplary positions for the output line focus in the x-z plane. These results can be obtained by an appropriate combination of linear and quadratic phase shifts according to known principles of Fourier optics. The dotted beams are modulated for steering and lensing, while the solid beams are unmodulated. Real images can be created in this way for display applications, or it can be used for imaging purposes.

Figure 4:
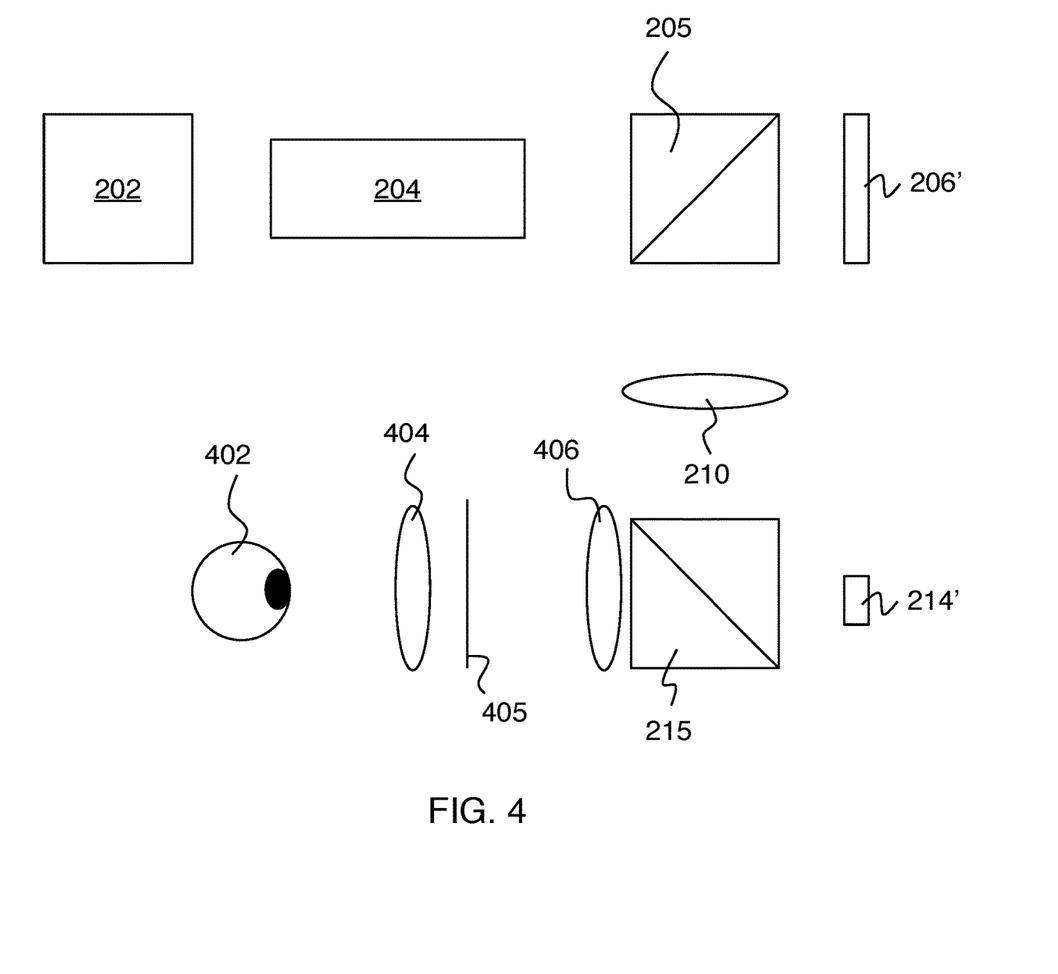
FIG. 4 shows a modification of the configuration of FIG. 2B suitable for direct view applications.

In some cases it will be desirable to directly view the output line focus, and in such cases the system can be modified accordingly. FIG. 4 shows an example. Here Fourier lens 216 is replaced with lenses 404, 406 configured to provide an appropriate image at the retina of a user's eye 402, taking the optical properties of the eye into account. Adding the eyepiece lenses 404, 406 is necessary to maintain collimation in the y axis for the eyeball. Here the placement between lens 404 and lens 406 is variable, but lens 404 must be one combined lens+eye focal distance away from eye 402. More specifically, the choice of optics is preferably optimized for the eye such that the conjugate plane is imaged onto the retina, the sheet length and scan distance is optimized for the eye's viewing area, and the viewing plane is at a comfortable distance. A patterned horizontal line can be scanned vertically by the 1-D phase modulator array to create a 2D image. This image can then be scanned axially with a parabolic phase profile, effectively creating a 3D image. 3D viewing in this manner naturally has focal cues, as the lens of the eye will adjust to compensate for the focal change of the parabolic phase profile, so that there is no vergence-accommodation conflict. Optionally, a spatial filter 405 can be included to remove higher diffraction orders from the output line image while still permitting beam steering of the output line image.

Accordingly, an embodiment of the invention can further include: second Fourier optics configured to receive the phase modulated light and to provide a third line-focus, where a third light pattern of the third line-focus is substantially a 2-D Fourier transform of the second light pattern of the second line-focus; and display optics configured to provide direct viewing of the zeroth diffraction order of the third line-focus. This embodiment can further include an output spatial filter (e.g., 405 on FIG. 4) disposed to pass a zeroth diffraction order of the third line-focus and to block nonzero diffraction orders of the third line focus.

Figure 5A:
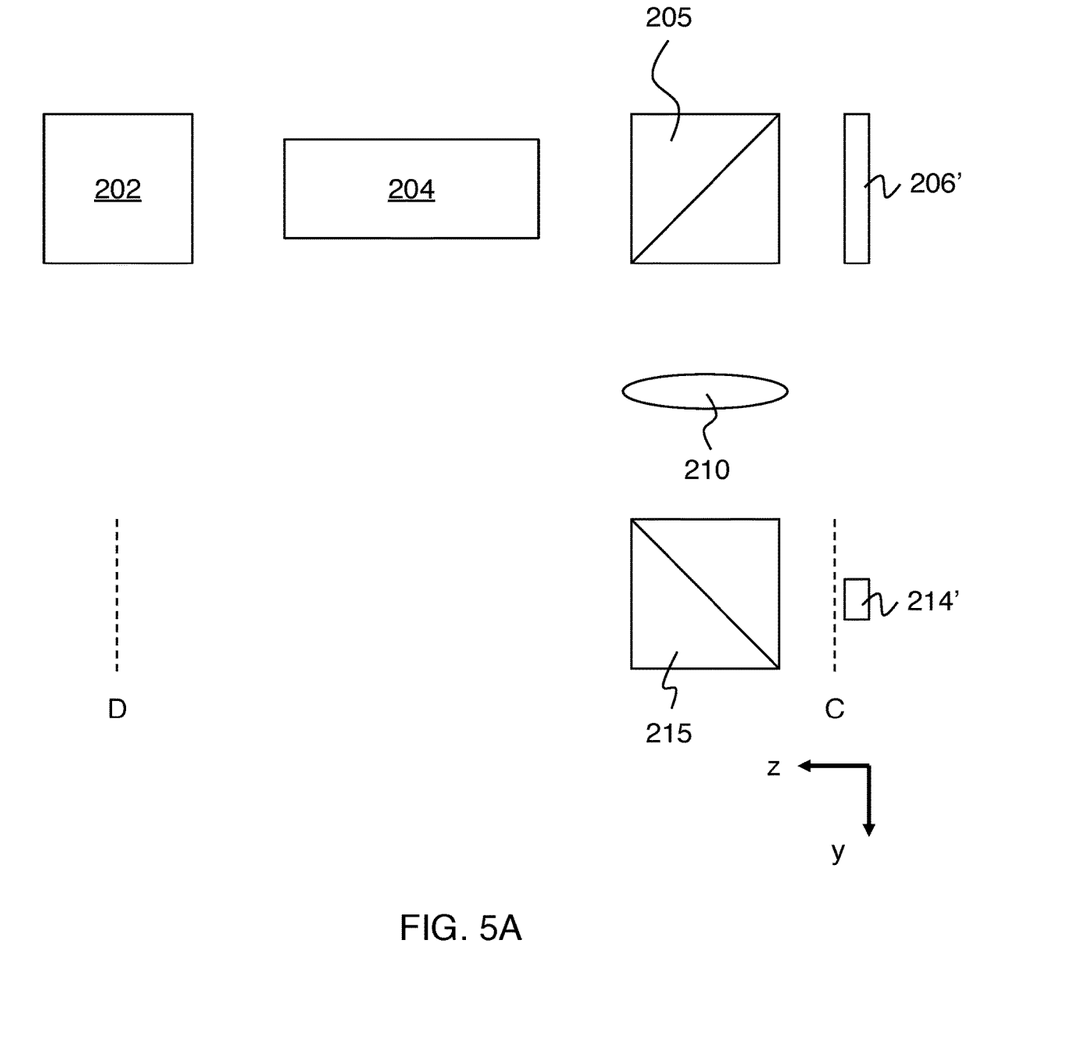
FIGS. 5A-B show two approaches for providing far field patterned illumination according to principles of the invention.

Another modification of the system is to dispense with all optical components after the 1-D phase modulator array. The resulting behavior will be formation of the output line image in the far field via free space propagation. FIG. 5A shows a first example of this configuration.

Figure 5B:
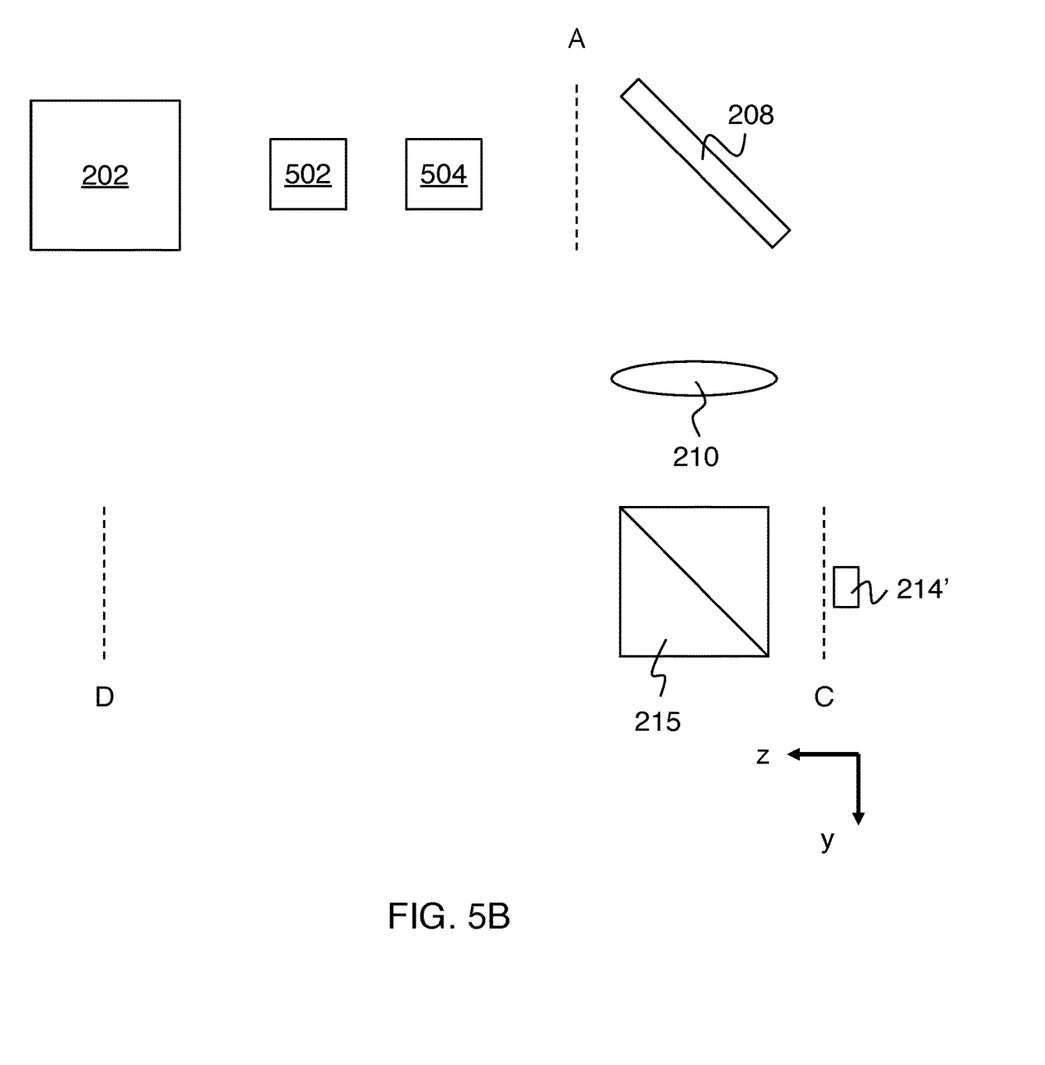

Practice of the invention does not critically depend on how the input patterned line is formed. The preceding examples formed the input patterned line by first forming a line focus and then patterning it with a 1D amplitude modulator array. An alternative approach to providing an input patterned line is to modulate the optical source and scan the modulated beam along the input line. With synchronized modulation and scanning, the result is an input patterned line having a well-defined modulation along its length. FIG. 5B schematically shows this approach in connection with far field scanning applications. Here 502 is an amplitude modulator (not an array) and 504 is a beam scanner. Optics (not shown) can be added as needed to provide an appropriate line pattern at plane A.

Accordingly, in an embodiment of the invention, the means for providing a first line-focus of light can include: an optical source; an optical modulator configured to receive input light from the optical source and to provide a modulated beam; and scanning optics configured to form the first line-focus by scanning the modulated beam along a length of the first line-focus.

Figure 6:
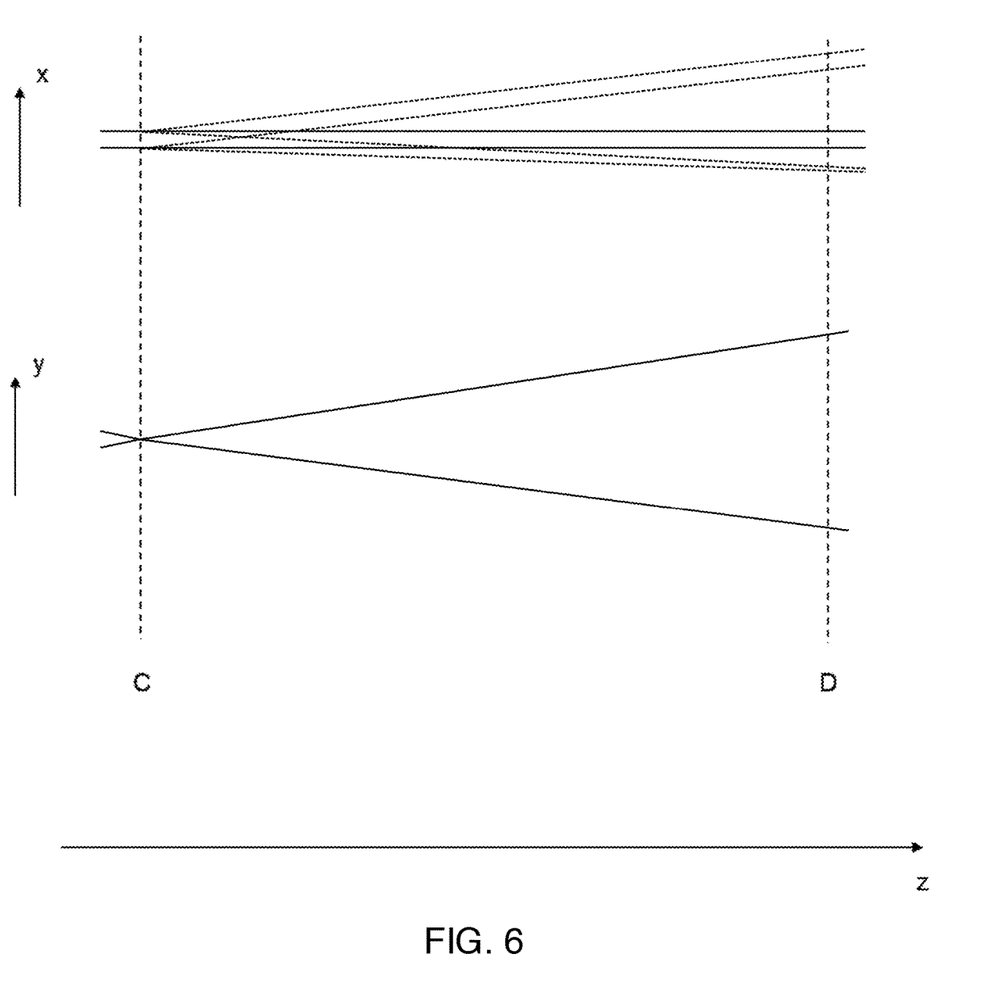
FIG. 6 schematically shows exemplary ray traces for the configuration of FIGS. 5A-B.

The resulting beam scanning behavior is the same for the configurations of FIGS. 5A and 5B. FIG. 6 schematically shows this. On the x axis, the solid line represents the unsteered beam. The dotted lines represent steering, and in addition the bottom pair of dotted lines is also being focused by the 1-D phase modulator array. In practice this approach will tend to provide a relatively poor field of view and have higher order diffraction in the output. However, the resulting performance may still be acceptable for some applications. Here D is in the far field which we can take to be 1 meter or more away from plane C.

Figure 7A:
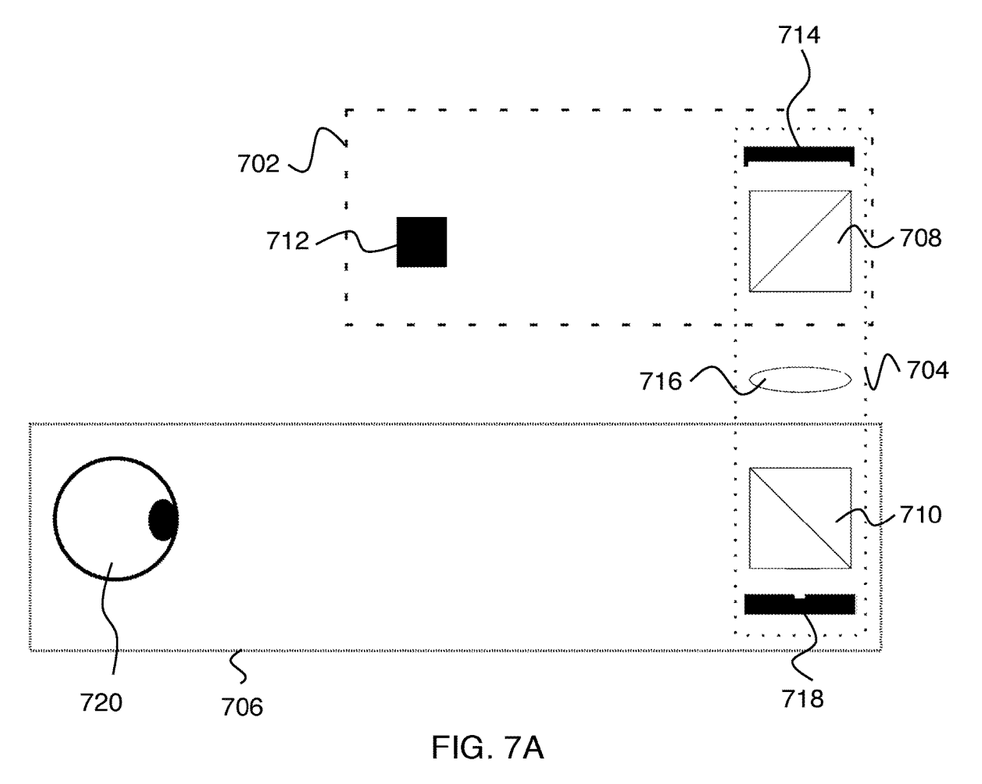
FIGS. 7A-D show an exemplary practical implementation of the configuration of FIG. 4.
Figure 7B:
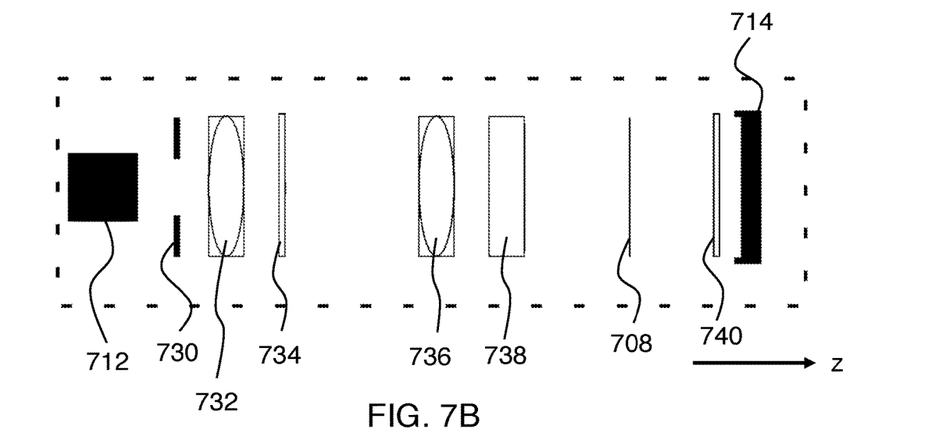
Figure 7C:
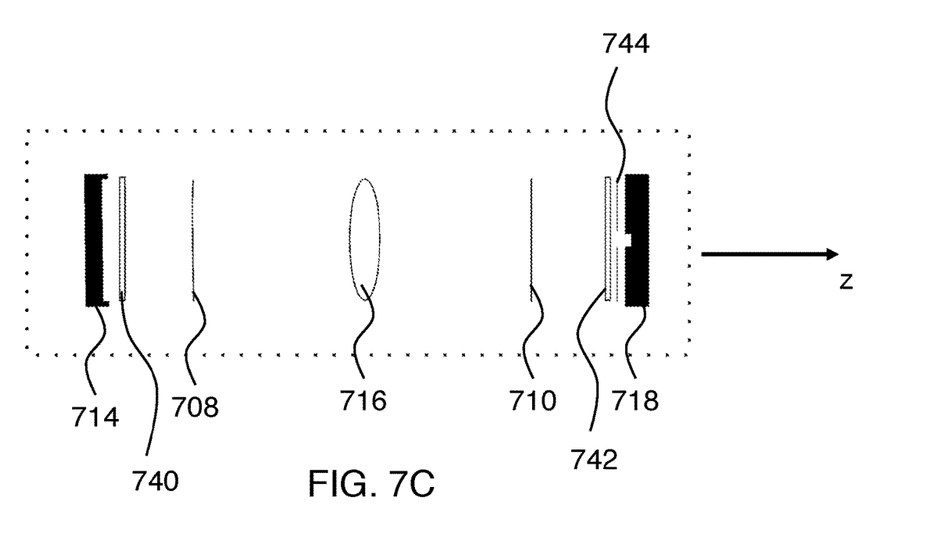
Figure 7D:
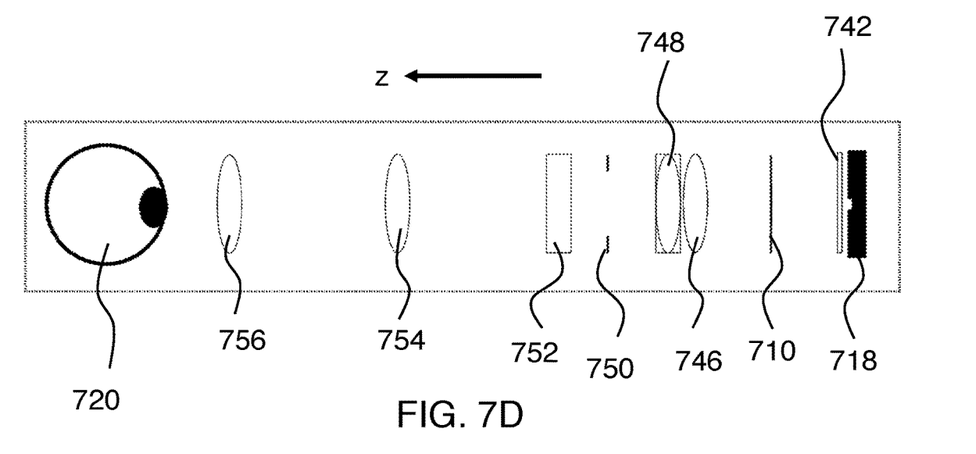

FIGS. 7A-D show a more detailed example of an optical configuration for practicing the invention, corresponding roughly to the configuration of FIG. 2B. Here FIG. 7A shows the overall optical configuration with only the most essential components shown, and FIGS. 7B, 7C and 7D show the details of parts 702, 704, 706, respectively.

The first part 702 of the optical train is shown on FIG. 7B. Here 712 is the laser source, 730 is a spatial filter, 732 is a cylindrical lens in y for expansion, 734 is a linear polarizer, 736 is a cylindrical lens in y for collimation, 738 is a cylindrical lens in x for focusing into a line, 708 is the first beamsplitter, 740 is the first quarter wave plate, and 714 is a grating light valve 1-D amplitude modulator array operating in reflection.

The second part 704 of the optical train is shown on FIG. 7C. Here 714 is the grating light valve 1-D amplitude modulator array operating in reflection, 740 is the first quarter wave plate, 708 is the first beamsplitter, 716 is the Fourier lens, 710 is the second beamsplitter, 742 is the second quarter wave plate, 744 is a spatial filter in x to block the grating light valve diffracted orders, and 718 is the 1-D phase modulator array.

The third part 706 of the optical train is shown on FIG. 7D. Here 718 is the 1-D phase modulator array, 742 is the second quarter waveplate, 710 is the second beamsplitter, 746 is a spherical lens, 748 is a cylindrical lens in y, 750 is spatial filter, 752 is a cylindrical lens in x, 754 is a spherical lens, 756 is a spherical lens as eyepiece, and 720 is an eye of a user. Here elements 746-754 are to adjust the aspect ratio of the 1-D phase modulator array output.

The invention claimed is:

1. Optical apparatus comprising:
    means for providing a first line-focus of light that is amplitude modulated along its length to provide amplitude modulated light;
    first Fourier optics configured to receive the amplitude modulated light and to provide a second line-focus, wherein a second light pattern of the second line-focus is substantially a 2-D Fourier transform of a first light pattern of the first line-focus;
    a 1-D phase modulator array disposed to align with the second line-focus and to provide phase modulated light.

2. The optical apparatus of claim 1, wherein the 1-D phase modulator array comprises an array of grating light valve devices.

3. The optical apparatus of claim 1, further comprising:
    second Fourier optics configured to receive the phase modulated light and to provide a third line-focus, wherein a third light pattern of the third line-focus is substantially a 2-D Fourier transform of the second light pattern of the second line-focus;
    projection optics configured to provide a far field radiation pattern corresponding to the zeroth diffraction order of the third line-focus.

4. The optical apparatus of claim 3, further comprising an output spatial filter disposed to pass a zeroth diffraction order of the third line-focus and to block nonzero diffraction orders of the third line focus.

5. The optical apparatus of claim 1, further comprising:
    second Fourier optics configured to receive the phase modulated light and to provide a third line-focus, wherein a third light pattern of the third line-focus is substantially a 2-D Fourier transform of the second light pattern of the second line-focus.

6. The optical apparatus of claim 1, further comprising:
    second Fourier optics configured to receive the phase modulated light and to provide a third line-focus, wherein a third light pattern of the third line-focus is substantially a 2-D Fourier transform of the second light pattern of the second line-focus;
    display optics configured to provide direct viewing of the zeroth diffraction order of the third line-focus.

7. The optical apparatus of claim 6, further comprising an output spatial filter disposed to pass a zeroth diffraction order of the third line-focus and to block nonzero diffraction orders of the third line focus.

8. The optical apparatus of claim 1, wherein the means for providing a first line-focus of light comprises:
    an optical source;
    input optics configured to receive input light from the optical source and to provide the first line-focus; and
    a 1-D amplitude modulator array disposed to align with the first line-focus and to provide the amplitude modulated light.

9. The optical apparatus of claim 8, wherein the 1-D amplitude modulator array comprises an array of grating light valve devices, and further comprising an amplitude modulation spatial filter disposed to pass a selected diffraction order of the second line-focus.

10. The optical apparatus of claim 9, wherein the selected diffraction order of the second line-focus is a zeroth diffraction order.

11. The optical apparatus of claim 9, wherein the selected diffraction order of the second line-focus is a +1 or −1 diffraction order.

12. The optical apparatus of claim 1, wherein the means for providing a first line-focus of light comprises:
    an optical source;
    an optical modulator configured to receive input light from the optical source and to provide a modulated beam; and
    scanning optics configured to form the first line-focus by scanning the modulated beam along a length of the first line-focus.

* * * * *